United States Patent
Takabatake et al.

(10) Patent No.: US 8,328,185 B2
(45) Date of Patent: Dec. 11, 2012

(54) MEDIUM STACK TRAY

(75) Inventors: Masanari Takabatake, Ishikawa (JP); Mieko Sakurai, Ishikawa (JP)

(73) Assignee: PFU Limited, Ishikawa (JP)

( * ) Notice: Subject to any disclaimer, the term of this patent is extended or adjusted under 35 U.S.C. 154(b) by 68 days.

(21) Appl. No.: 13/081,312

(22) Filed: Apr. 6, 2011

(65) Prior Publication Data
US 2011/0291351 A1 Dec. 1, 2011

(30) Foreign Application Priority Data
May 26, 2010 (JP) .................. 2010-120847

(51) Int. Cl.
*B65H 1/00* (2006.01)

(52) U.S. Cl. ........ 271/145; 271/164; 271/162; 271/213; 399/377; 399/405

(58) Field of Classification Search .................. 271/145, 271/164, 162, 213; 399/377, 405
See application file for complete search history.

(56) References Cited

U.S. PATENT DOCUMENTS
5,613,672 A 3/1997 Tanaka et al.
2011/0292455 A1 * 12/2011 Takabatake et al. .......... 358/401

FOREIGN PATENT DOCUMENTS
JP 08-073050 3/1996
JP 2000211786 A * 8/2000

* cited by examiner

*Primary Examiner* — Luis A Gonzalez
(74) *Attorney, Agent, or Firm* — McDermott Willl & Emery LLP (57) ABSTRACT

A medium stack tray comprises a stacking member that stacks a sheet medium and is configured to be wound in a roll, a winding mechanism that winds the stacking member, a regulating mechanism that regulates the stacking member being pulled out to be wound by the winding mechanism, and a releasing mechanism that releases regulation for winding the stacking member by the regulating mechanism.
In the stacking member being pulled out, at least a portion of a cross section thereof, in a perpendicular direction to a pull-out direction of the stacking member, has a curved shape.
Alternatively, the stacking member is configured to have greater minimum area moment of inertia of a cross section when pulled out, than when wound up.

18 Claims, 9 Drawing Sheets

FIG.1A

FRONT VIEW
(CROSS SECTION)

FIG.1B

SIDE VIEW
(A-A CROSS SECTION)

FRONT VIEW
(CROSS SECTION)

FIG.9B

SIDE VIEW
(B-B CROSS SECTION)

FIG.11A

WIDTH DIRECTION

FRONT VIEW
(CROSS SECTION)

FIG.11B

FRONT-REAR DIRECTION
FRONT SIDE ←→ REAR SIDE

SIDE VIEW
(C-C CROSS SECTION)

FIG.12

MEDIUM STACK TRAY

CROSS-REFERENCE TO RELATED APPLICATIONS

This application is based upon and claims the benefit of priority from Japanese Patent Application No. 2010-120847, filed May 26, 2010, the entire contents of which are incorporated herein by reference.

BACKGROUND OF THE INVENTION

1. Field of the Invention

The present invention relates to a medium stack tray.

2. Description of the Related Art

Conventionally, there has been proposed a technology that enables to house a medium stack tray, which stacks media such as read-target media, in a main body. Japanese Patent Application Laid-open No. 08-073050 discloses a technology on a paper retainer including a paper-sheet holder member that can switch between a state in which the paper-sheet holder member is housed in a main-body case and a state in which the paper-sheet holder member is pulled out so as to protrude outward from the main-body case.

In order to downsize an apparatus that includes the medium stack tray, it is desirable to house the medium stack tray in a compact manner. It is also desirable to ensure a sufficient size of the medium stack tray for stacking a medium when the medium stack tray is used.

SUMMARY OF THE INVENTION

It is an object of the present invention to at least partially solve the problems in the conventional technology.

According to an aspect of the present invention, a medium stack tray comprises a stacking member that stacks a sheet medium and that is configured to be wound in a roll, a winding mechanism that winds the stacking member in a roll, a regulating mechanism that regulates the stacking member that has been pulled out to be wound by the winding mechanism, and a releasing mechanism that releases regulation for winding the stacking member by the regulating mechanism. In the stacking member that has been pulled out, at least a portion of a cross section thereof, in a perpendicular direction to a pull-out direction of the stacking member, has a curved shape.

According to another aspect of the present invention, a medium stack tray comprises a stacking member that stacks a sheet medium and that is configured to be wound in a roll, a winding mechanism that winds the stacking member in a roll, a regulating mechanism that regulates the stacking member that has been pulled out to be wound by the winding mechanism, and a releasing mechanism that releases regulation for winding the stacking member by the regulating mechanism. Minimum area moment of inertia of a cross section of the stacking member that has been pulled out, the cross section being perpendicular to a pull-out direction, is greater than minimum area moment of inertia of a cross section of the stacking member that is wound up, the cross section being perpendicular to a circumferential direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a medium stack tray according to the present invention will be explained in detail below with reference to the accompanying drawings. The present invention is not limited to the embodiments. The components in the following embodiment may include those which a person skilled in the art would easily conceive from the embodiments disclosed and those which are substantially equivalent to the components disclosed in the embodiment.

First Embodiment

Figure 1A:
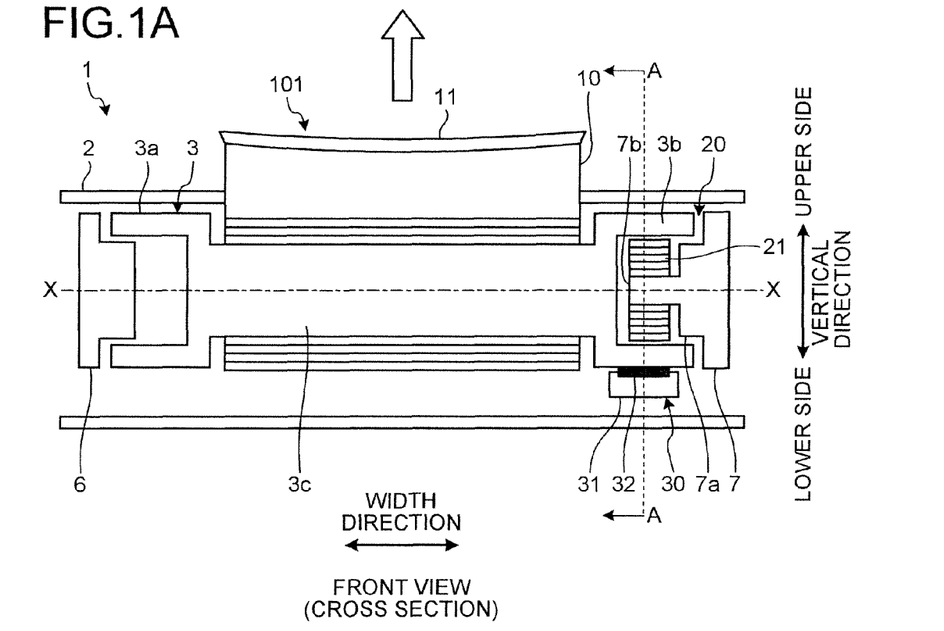
FIG. 1A is a front view of a medium stack tray according to a first embodiment.
Figure 1B:
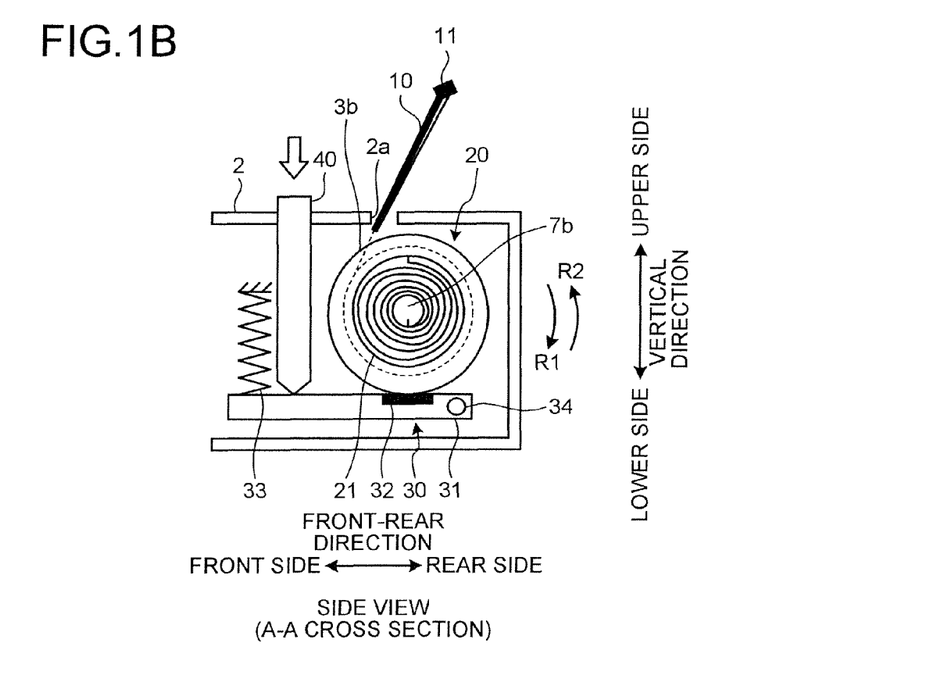
FIG. 1B is a side view of the medium stack tray according to the first embodiment.
Figure 2:
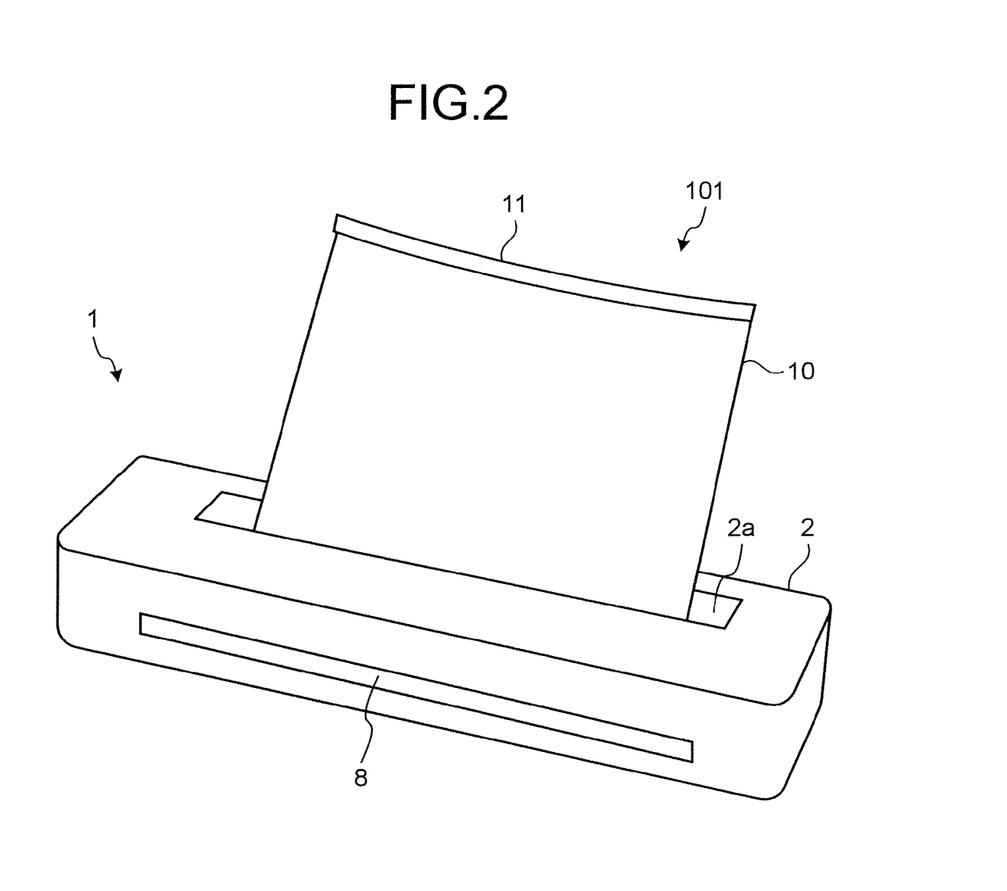
FIG. 2 is a perspective view of an image reading apparatus that includes the medium stack tray according to the first embodiment.
Figure 3:
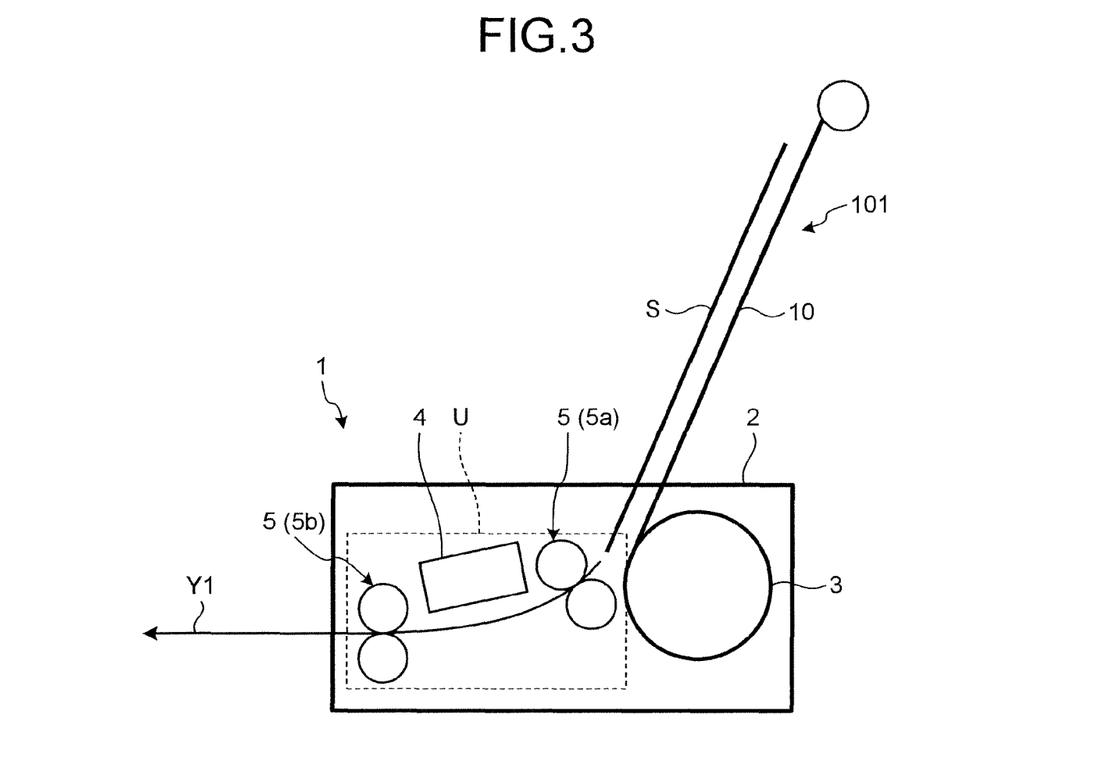
FIG. 3 is a diagram of the medium stack tray when a hopper is set according to the first embodiment.
Figure 4:
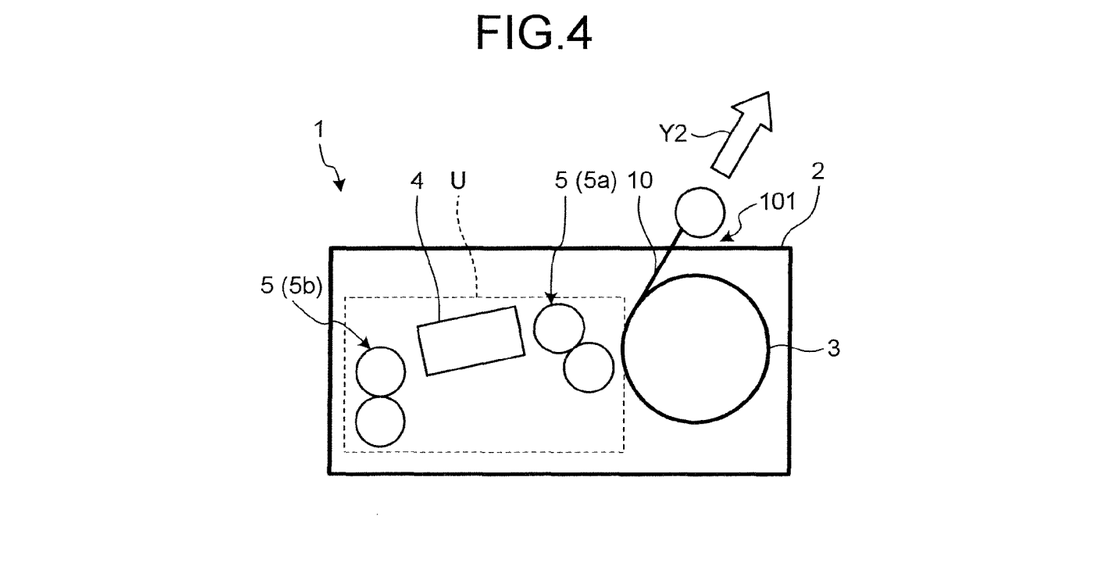
FIG. 4 is a diagram of the medium stack tray when the hopper is housed according to the first embodiment.

A first embodiment relating to a medium stack tray will be described below with reference to FIG. 1A to FIG. 5. FIG. 1A is a front view and FIG. 1B is a side view of a medium stack tray according to the first embodiment; FIG. 2 is a perspective view of an image reading apparatus that includes the medium stack tray according to the first embodiment; FIG. 3 is a diagram showing a state where the medium stack tray, as a hopper, is set; and FIG. 4 is a diagram showing a state where the medium stack tray, as the hopper, is housed.

A medium stack tray 101 according to the first embodiment employs a flexible component as a medium stacking unit, and the flexible component is wound up in a roll and housed in an apparatus main body. At the time of use, the wound-up flexible component is pulled out and used, and, when use of the flexible component is over, the flexible component is wound up and housed in a single action. Accordingly, the medium stack tray 101 enables to house an original stacking unit of a large size in a compact manner. Because the original stacking unit is neatly housed in the apparatus, quality in design is enhanced. Further, the original stacking unit is housed in the apparatus main body, which enables to downsize the apparatus. Moreover, since the flexible component is automatically wound up and housed, the operability of the medium stack tray 101 can be improved.

An image reading apparatus 1 shown in FIG. 2 picks up or captures an image of a sheet medium and generates an image data of the medium. The image reading apparatus 1 includes the medium stack tray 101 which functions as a hopper. A stacking member 10 of the medium stack tray 101 functions as a hopper for feeding one or more media stacked thereon. The image reading apparatus 1 pulls in a medium within the media stacked on the stacking member 10 inside the image reading apparatus 1, and picks up an image of the medium by using an image reading unit, which will be described below. The medium that has been captured is discharged from a discharge port 8.

As shown in FIG. 3, an image reading unit U is arranged in a case 2 of the image reading apparatus 1. The image reading unit U includes a sensor 4 and conveying rollers 5. The conveying rollers 5 include an upstream-side conveying roller 5a which is disposed on the upstream side of the sensor 4 in the conveying direction, and a downstream-side conveying roller 5b which is disposed on the downstream side of the sensor 4 in the conveying direction. A medium S stacked on the stacking member 10 is pulled inside by the upstream-side conveying roller 5a and conveyed in the conveying direction indicated by an arrow Y1. The sensor 4 is an imaging device that picks up an image of the medium S. The sensor 4 is, for example, a CIS (Contact Image Sensor). The sensor 4 picks up an image of the medium S being conveyed by the conveying rollers 5, and generates image data. The medium S that has been captured is discharged to the outside of the case 2 by the downstream-side conveying roller 5b.

In the medium stack tray 101 according to the first embodiment, the stacking member 10 can be wound up. As shown in FIG. 4, the stacking member 10 can be wound up around a rotary shaft 3. Since the stacking member 10 is wound up and housed in the case 2 as described above, the entire image reading apparatus 1 can be downsized.

When the hopper is set for use, the stacking member 10 is pulled out in a direction of an arrow Y2 by a user. The stacking member 10 that has been pulled out from the case 2 can stand by itself or stands alone as the hopper for stacking one or more media S as shown in FIG. 3. As will be described below, the stacking member 10, when pulled out, has a cross section capable of standing alone. More specifically, the pulled-out stacking member 10 has a curvature, and at least a portion of the cross section perpendicular to a pull-out direction has a curved shape. Therefore, the stacking member 10 does not cause buckling by its own weight, but rather stands alone while supporting the weight of the stacked one or more media S. The stacking member 10 is, for example, a stainless spring steel with a curvature set in advance. That is, the curved shape of the cross section of the pulled-out stacking member 10 is formed in advance in the stacking member 10.

The stacking member 10 in the pulled-out state can stand alone because of the curved shape. On the other hand, when the stacking member 10 is wound up around the rotary shaft 3 by a winding mechanism, the stacking member 10 is elastically deformed such that a cross section perpendicular to a circumferential direction becomes flatter than the cross section in the pulled-out state. According to the first embodiment, the stacking member 10 is elastically deformed such that the cross section perpendicular to the circumferential direction is formed in a linear shape when the stacking member 10 is wound up, so that the cross section becomes flat. Therefore, the outer diameter of a roll of the stacking member 10 in the wound-up state is reduced, so that the stacking member 10 can be housed in a compact manner. When the stacking member 10 is pulled out, the stacking member 10 recovers the shape that is formed in advance, from the flat cross section caused by elastic deformation by winding, so that the cross section in the curved shape is obtained. Therefore, a user can set the stacking member 10 as a hopper which stands alone by only pulling out the stacking member 10.

The medium stack tray 101 will be described in detail below with reference to FIGS. 1A and 1B. The medium stack tray 101 includes the stacking member 10, a winding mechanism 20, a regulating mechanism 30, and a release button 40. The stacking member 10 is a member in the form of a sheet or a plate, and can stack one or more sheet media. The stacking member 10 can be elastically deformed and can be wound up. The width of the stacking member 10 in the width direction of the image reading apparatus 1 corresponds to the maximum width of the media S that the image reading apparatus 1 can handle. In the following descriptions, a "width direction", a "front-rear direction", and a "vertical direction" respectively indicate the width direction, the front-rear direction, and the vertical direction of the image reading apparatus 1 unless otherwise noted. In the first embodiment, the width direction of the image reading apparatus 1 is the same as the width direction of the media S. The rotary shaft 3 is arranged inside the case 2 of the image reading apparatus 1. The rotary shaft 3 is disposed so that a central axis line X thereof becomes parallel to the width direction.

The rotary shaft 3 includes cylindrical portions 3a and 3b, and an axial portion 3c. The axial portion 3c is in the form of a cylinder or a round shaft. The cylindrical portions 3a and 3b are arranged on respective ends of the rotary shaft 3. The cylindrical portions 3a and 3b, and the axial portion 3c are coaxially formed. The rotary shaft 3 is rotatably supported by bearings 6 and 7. The cylindrical portion 3a formed on one end of the axial portion 3c in the axial direction is supported by the bearing 6. The cylindrical portion 3b arranged on the other end of the axial portion 3c in the axial direction is supported by the bearing 7. One end of the stacking member 10 in the longitudinal direction is fixed to the axial portion 3c, and the stacking member 10 can be wound up around the outer circumference of the axial portion 3c.

The winding mechanism 20 winds the stacking member 10 in a roll. The winding mechanism 20 includes the bearing 7, a spiral spring 21, and the rotary shaft 3. The bearing 7 and the cylindrical portion 3b are connected to each other via the spiral spring 21. The bearing 7 includes a round shaft portion 7a that has an outer diameter corresponding to the inner diameter of the cylindrical portion 3b, and an axial portion 7b that protrudes from the round shaft portion 7a and is in the form of a cylinder with a diameter smaller than the diameter of the cylindrical portion 7a. The round shaft portion 7a is engaged with the cylindrical portion 3b and rotatably supports the rotary shaft 3. The spiral spring 21 has a spiral shape, of which inner end in the radial direction is fixed to the outer circumferential surface of the axial portion 7b and of which outer end in the radial direction is fixed to the inner circumferential surface of the cylindrical portion 3b. The bearing 7 is fixed to the case 2. The spiral spring 21 can roll up the stacking member 10 by rotating the rotary shaft 3 by the spring force. That is, the spiral spring 21 is fixed to the cylindrical portion 3b and the axial portion 7b such that the rotational force in a normal rotation direction R2, which is a rotation direction for rolling up the stacking member 10, always acts on the rotary shaft 3. Therefore, the stacking member 10 can be wound up around the rotary shaft 3 by the spring force of the spiral spring 21 until a pulled-out amount reaches a minimum amount. A reference symbol R1 denotes a rotation direction opposite to the normal rotation direction R2, i.e., a reverse rotation direction.

A pulling parts 11 as a pull-out member is arranged on a tip of the stacking member 10 in the pull-out direction. The pulling parts 11 is a fixing-to-edge member that extends in the width direction of the medium S and is fixed to an edge of the stacking member 10. The pulling parts 11 is made of, for example, metal, and functions as a handle for pulling out the stacking member 10. The pulling parts 11 is rigid enough not to be deformed when the stacking member 10 is pulled out against the spring force of the spiral spring 21, and enables to equally pull out the stacking member 10. The pulling parts 11 may be a member in the form of, for example, a bar or a pipe. The pulling parts 11 has the length corresponding to the width of the stacking member 10, and is arranged from one end to the other end of the stacking member 10 in the width direction. The pulling parts 11 is curved such that the center portion in the width direction is positioned closer to the rear side than the both end portions.

Figure 5:
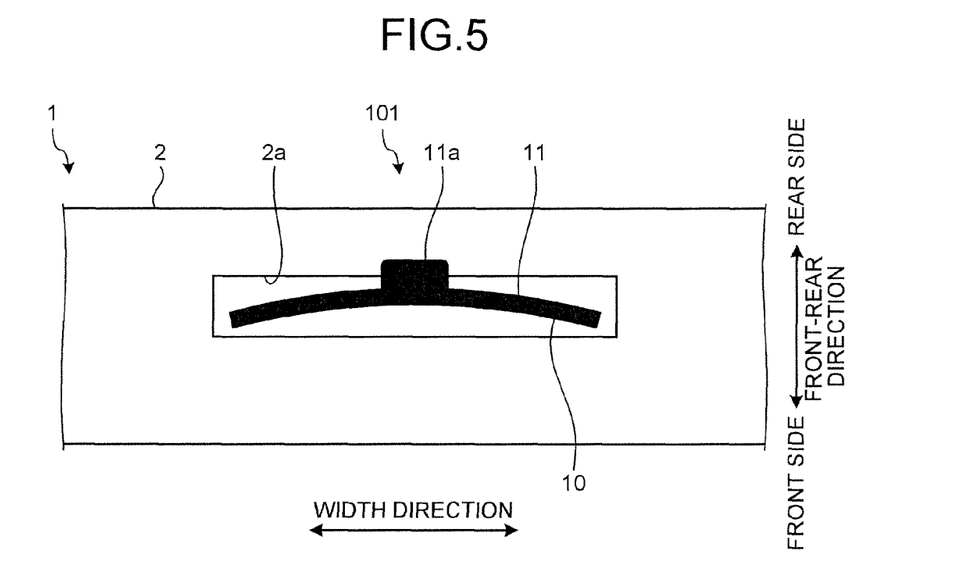
FIG. 5 is a top view of the image reading apparatus according to the first embodiment.

FIG. 5 is a top view of the image reading apparatus 1 according to the first embodiment. A hopper port 2a is formed on the top surface of the case 2. The hopper port 2a is an opening in the form of a rectangle. The length of the hopper port 2a in the width direction is slightly longer than the length of the stacking member 10. The width of the hopper port 2a in the front-rear direction is slightly wider than the width of the curved stacking member 10 in the front-rear direction. The pulled-out stacking member 10 is entirely curved such that the center portion in the width direction is positioned closer to the rear side than the both end portions. That is, the stacking member 10 is curved such that the cross section perpendicular to the pull-out direction has a convex shape protruding toward the rear side. The width of the hopper port 2a in the front-rear direction is set so that the curved stacking member 10 can pass through the hopper port 2a maintaining the curved shape formed in advance. The pulling parts 11 has a curved shape corresponding to the curved shape of the stacking member 10. The pulling parts 11 is entirely curved such that the center portion in the width direction is positioned closer to the rear side than the both end portions, similarly to the stacking member 10. That is, the pulling parts 11 functions as a member that maintains the curved shape of the stacking member 10 that is formed in advance.

A stopper 11a is formed on the pulling parts 11. The stopper 11a is formed in the center portion of the pulling parts 11 in the width direction, and protrudes toward the rear side of the stacking member 10. When the stacking member 10 is wound up, the stopper 11a comes into contact with the case 2 at the hopper port 2a, so that further winding is regulated. Therefore, the stacking member 10 is housed in the case 2 such that it is wound up around the rotary shaft 3 while the upper end portion is located at the hopper port 2a.

The regulating mechanism 30 shown in FIGS. 1A and 1B regulates winding of the pulled-out stacking member 10, which is performed by the winding mechanism 20. The regulating mechanism 30 includes a lever 31, a frictional pad 32, and a spring 33. The lever 31 is a member in the form of a plate, and is disposed at a position below the cylindrical portion 3b along the front-rear direction. The lever 31 faces the outer circumferential surface of the cylindrical portion 3b. The lever 31 is rotatably supported at a supporting point 34 on one end thereof, so that the lever 31 can rotate in a direction in which the lever 31 separates from or approaches the cylindrical portion 3b. The spring 33 connects the other end of the lever 31 and the case 2. The spring 33 is, for example, a coil spring, and generates a spring force in the axial direction. The spring 33 is stretched and connected to the lever 31 and the case 2. Therefore, the lever 31 is biased or energized toward the cylindrical portion 3b by the spring force of the spring 33.

That is, the lever 31 is pressed against the outer circumferential surface of the cylindrical portion 3b by the spring force of the spring 33. The frictional pad 32 is fixed to the lever 31 so as to face the outer circumferential surface of the cylindrical portion 3b. The frictional pad 32 may be made of a material with a large friction coefficient, such as rubber. Because the frictional pad 32 is pressed against the cylindrical portion 3b by the spring 33, the rotation of the rotary shaft 3 is regulated by the frictional force.

Therefore, when a user stops pulling the stacking member 10 while the user is pulling the stacking member 10, the rotation of the rotary shaft 3 is regulated by the regulating mechanism 30 and the stacking member 10 stops at this position. Therefore, a user can pull out and set the stacking member 10 with an arbitrary height in accordance with the size of the medium S or an installation environment of the image reading apparatus 1.

The release button 40 is a releasing mechanism that releases regulation for winding, which is performed by the regulating mechanism 30. The release button 40 is a member in the form of a bar. When pushed by a user, the release button 40 presses the lever 31 in a direction in which the lever separates from the cylindrical portion 3b. More specifically, one end of the release button 40 is brought into contact with the top surface of the lever 31 facing the cylindrical portion 3b. The other end of the release button 40 protrudes from the top surface of the case 2. The release button 40 is disposed on the same side as the spring 33 with respect to the frictional pad 32. When pushed downward, the release button 40 presses the lever 31 in a direction in which the lever 31 separates from the cylindrical portion 3b against the biasing force of the spring 33. Therefore, by pushing the release button 40, a user can release the regulation, which is performed by the regulating mechanism 30 for regulating the winding, and cause the winding mechanism 20 to wind or roll up the stacking member 10 around the rotary shaft 3. By stopping pushing of the release button 40, the release button 40 is pushed upward by the biasing force of the spring 33, so that the frictional pad 32 is pressed against the cylindrical portion 3b and the winding by the winding mechanism 20 is regulated. Therefore, it is possible to stop the stacking member 10 at an arbitrary position while the stacking member 10 is being wound up.

As described above, according to the medium stack tray 101 of the first embodiment, the stacking member 10 is wound up around the rotary shaft 3, so that the stacking member 10 can be housed in the case 2 in a compact manner. Because the stacking member 10 is housed in a wound up manner, it is possible to easily house even the stacking member 10 that functions as a hopper with a size enough to stack one or more media S at the time of use. The stacking member 10 in a state of being pulled out from the case 2, herein after referred to as pulled-out stacking member 10, can stand by itself or stand alone due to the curved shape that is formed in advance, and can stack one or more media S. The pulled-out stacking member 10 has the cross section of the curved shape, so that the minimum area moment of inertia of the cross section is greater than that obtained in the state in which the stacking member is made flat and wound up around the rotary shaft 3. That is, the minimum area moment of inertia of the cross section perpendicular to the pull-out direction of the stacking member 10 in the pulled-out state is greater than the minimum area moment of inertia of the cross section perpendicular to the circumferential direction of the stacking member 10 in the wound up state. Therefore, the stacking member 10 can stand alone against the bending moment due to the own weight and the weight of the stacked one or more media S.

In the first embodiment, the cross section of the stacking member 10 perpendicular to the pull-out direction has an entirely-curved shape; however, the shape of the cross section is not limited thereto. It is sufficient that at least a portion of the cross section of the stacking member 10 perpendicular to the pull-out direction is curved. For example, it may be possible to employ a cross-sectional shape in which only a middle portion in the width direction is curved and both end portions are flat or a cross-sectional shape in which only both end portions in the width direction are curved and a middle portion is flat. The orientation of the curve of the cross-sectional shape is not limited to that described in the first embodiment. The cross-sectional shape may be curved so as to protrude toward the front side. The orientation of the curve is not limited to one orientation. For example, the cross-sectional shape may be curved in a wave form. The cross-sectional shape of the stacking member 10 in the pulled-out state may be a shape that increases the area moment of inertia compared to the flat shape and that is different from the curved shape.

According to the first embodiment, the medium stack tray 101 is arranged as the hopper for stacking the one or more media S to be fed. However, instead of or in addition to the above, it is possible to arrange the medium stack tray 101 on the image reading apparatus 1 as a stacker for stacking one or more media S discharged.

The pull-out direction of the stacking member 10 is not limited to the upward direction. The stacking member 10 may be pulled out in a frontward direction or a backward direction of the image reading apparatus 1. Therefore, the hopper port 2a is not limited to that formed on the top surface of the case 2, and may be formed on the front face or the rear face of the case 2.

In the first embodiment, an example is explained in which the medium stack tray 101 is arranged on the image reading apparatus 1. However, the present invention is not limited to this example. The medium stack tray 101 may be arranged, as a hopper or a stacker for a medium, on other apparatuses that handle a sheet medium, such as a printer.

Modification of the First Embodiment

Figure 6:
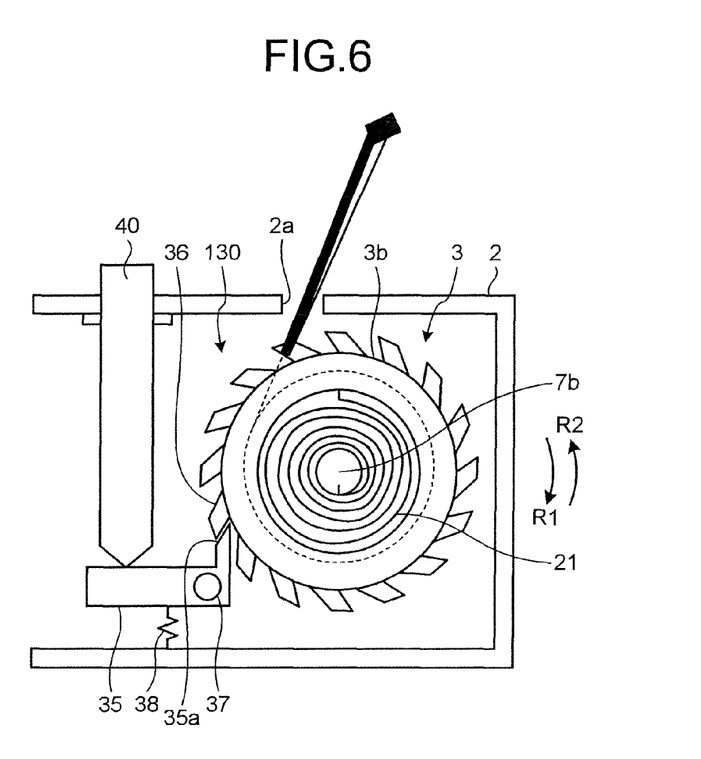
FIG. 6 is a side view of a regulating mechanism according to a modification of the first embodiment.

In the first embodiment described above, the regulating mechanism 30 regulates the rotation of the rotary shaft 3 by the frictional force of the frictional pad 32. However, in the present modification, the rotation of the rotary shaft 3 is regulated by a ratchet structure. FIG. 6 is a side view of a regulating mechanism 130 according to the modification.

As shown in FIG. 6, the regulating mechanism 130 regulates the rotation of the rotary shaft 3 by a ratchet structure. In the modification, the cylindrical portion 3b is formed as a gear having teeth 36 formed on the outer circumferential surface thereof, and the latchet structure includes the cylindrical portion 3b with the teeth 36 and a lever 35 having a claw 35a. The teeth 36 formed on the outer circumferential surface of the cylindrical portion 3b are inclined along the normal rotation direction R2 and outward in the radial direction. The lever 35 is rotatably supported at a supporting point 37 of a base end portion of the claw 35a. The regulating mechanism 130 includes a compression spring 38 that is disposed between the lever 35 and the case 2. The spring 38 applies biasing force to the lever 35 to rotate the lever in the reverse rotation direction R1 (clockwise in FIG. 6) around the supporting point 37 as the center of rotation. The claw 35a is engaged with the teeth 36 of the cylindrical portion 3b that is to rotate in the normal rotation direction R2, and regulates the rotation of the rotary shaft 3 in the normal rotation direction R2 with the aid of the release button 40. When the stacking member 10 is pulled out and the rotary shaft 3 rotates in the reverse rotation direction R1, the claw 35a does not engage with the teeth 36 and allows the cylindrical portion 3b to rotate in the reverse rotation direction R1.

Figure 7:
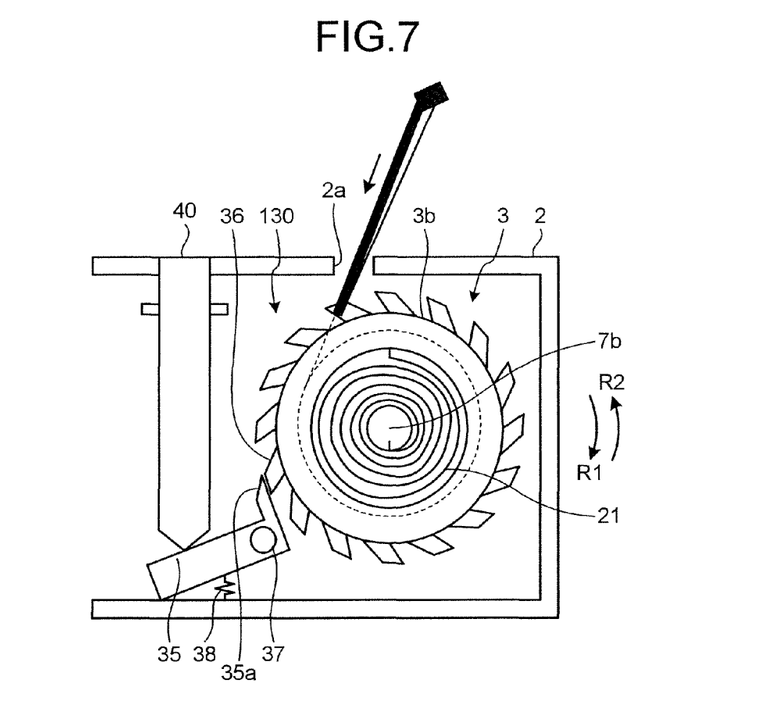
FIG. 7 is a diagram illustrating a state in which a release button is pressed and regulation is released according to a modification of the first embodiment.

The release button 40 is brought into contact with an end of the lever 35 on the opposite side of the claw 35a. The release button 40 also functions as a stopper that receives a spring force of the spiral spring 21, which is transmitted via the teeth 36, and stops the lever 35. When the release button 40 is pressed, the claw 35a rotates the cylindrical portion 3b in the reverse rotation direction R1 against the spring force of the spiral spring 21, so that the claw 35a and the teeth 36 disengage from each other. FIG. 7 is a diagram illustrating a state in which the release button 40 is pressed and the regulation is released. By releasing the regulation, which is performed by the regulating mechanism 130 for regulating the winding, the rotary shaft 3 rotates in the normal rotation direction R2 and the stacking member 10 is wound up around the rotary shaft 3.

Second Embodiment

Figure 8:
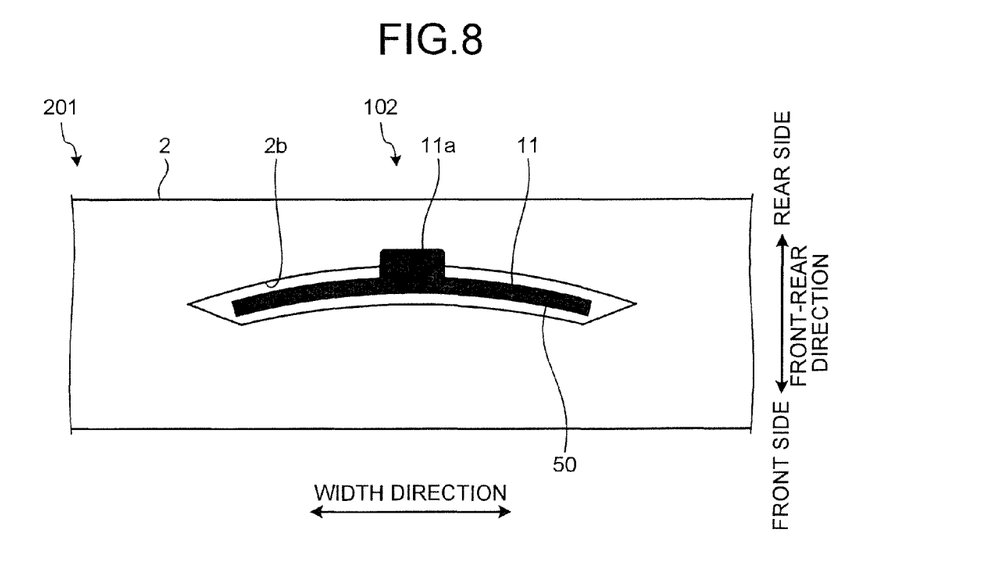
FIG. 8 is a top view of an image reading apparatus according to a second embodiment.

A second embodiment will be described below with reference to FIG. 8. In the second embodiment, components that have the same functions as those of the above embodiment are denoted by the same reference numerals and explanation thereof is not repeated. FIG. 8 is a top view of an image reading apparatus 201 according to the second embodiment.

A medium stack tray 102 of the second embodiment is different from the medium stack tray 101 of the first embodiment in that a curvature of a stacking member 50 is formed by a hopper port 2b and the pulling parts 11 rather than that the curvature is formed in advance in the stacking member 50.

As shown in FIG. 8, the hopper port 2b is an opening in the form of a slit having a curved portion. The width of the opening of the hopper port 2b in the front-rear direction is slightly greater than the thickness of the stacking member 50 and is wide enough to stack one or more media S on the stacking member 50. The hopper port 2b is entirely curved such that the center portion in the width direction is positioned closer to the rear side than the both end portions. The pulling parts 11 has a curved shape corresponding to the curved shape of the hopper port 2b. That is, the pulling parts 11 is entirely curved such that the center portion in the width direction is positioned closer to the rear side than the both end portions. The state, in which the curved shape of the hopper port 2b and the curved shape of the pulling parts 11 correspond to each other, indicates that corresponding portions are curved with the same or approximately the same curvature.

The stacking member 50 is a member in the form of a sheet or a plate, and is elastically deformable. The material of the stacking member 50 may be, for example, a stainless spring steel. The stacking member 50 may be an extremely thin material (e.g., with a thickness of 0.02 mm to 0.05 mm). The stacking member 50 does not have a curvature in advance, unlike the stacking member 10 of the first embodiment described above.

Since the hopper port 2b, which is a port for pulling out the stacking member 50 in the winding mechanism 20, is in the form of a curved slit, the stacking member 50 pulled out from the case 2 is formed in a curved shape corresponding to the curved shape of the hopper port 2b. Since the stacking member 50 is elastically deformed in accordance with the shape of the hopper port 2b, the cross section of the stacking member 50 perpendicular to the pull-out direction is formed in a curved shape. The stacking member 50, which has been in a flat state and wound up around the rotary shaft 3, is pulled out to the outside of the case 2 via the curved hopper port 2b, and as a result, a portion of the stacking member 50 pulled out above the hopper port 2b is formed in a curved shape. The cross section of the pulled-out portion, which is perpendicular to the pull-out direction, has a curved shape, so that the portion can stand by itself or stand alone against the bending moment or the like, and can stack one or more media S.

Because the pulling parts 11 has the curved shape, the cross section of the stacking member 50 can have a curved shape corresponding to the curved shape of the pulling parts 11. The cross section of the pulling parts 11 perpendicular to the pull-out direction has a curved shape, so that the stacking member 50 fixed to the pulling parts 11 is elastically deformed in accordance with the shape of the pulling parts 11. Therefore, the cross section of the stacking member 50 perpendicular to the pull-out direction is formed in a curved shape. In particular, in the second embodiment, the pulling parts 11 has the curved shape corresponding to the hopper port 2b. Therefore, the shape of the cross section can be maintained by a tip portion and a base end portion of the pulled-out stacking member 50, so that warp or deformation of the cross section shape of the pulled-out stacking member 50 can be suppressed. Consequently, deformation of the stacking member 50 against an external force can be suppressed, and the hopper can stand up more stably.

In the second embodiment, the curvature is formed in the stacking member 50 by both the hopper port 2b and the pulling parts 11. However, it is possible to form a curvature in the stacking member 50 by just either one of the hopper port 2b and the pulling parts 11.

Alternatively, the stacking member 10 of the first embodiment, whose curvature is formed in advance, may be used in such a manner that the curvature is further maintained by the hopper port 2b. That is, it is possible to regulate change in the curvature of the stacking member 10 that has received an external force, i.e., change or deformation in the cross-sectional shape, by using the hopper port 2b.

In the second embodiment, the hopper port 2b and the pulling parts 11 have the entirely-curved shapes. However, the present invention is not limited to this embodiment. The curved portion in the curved shape may be formed on a portion of the hopper port 2b or the pulling parts 11 in the width direction. For example, only both end portions of the hopper port 2b in the width direction may be curved and the middle portion may be formed as flat. In this case, one or more media S may be stack on the flat portion in the middle portion. With this structure, it is possible to stack the one or more media S in a flat state on the stacking member 50.

Although the second embodiment explains an embodiment where the hopper port 2b also serves as a feed port or a discharge port of a medium S, the hopper port 2b and the feed port or the discharge port of the medium S may be separated from each other. That is, the hopper port 2b may be used for forming a curvature on the stacking member 50 and a medium S to be stacked on the stacking member 50 may be fed into or discharged from the case 2 via an opening different from the hopper port 2b. With this structure, it is possible to form the hopper port 2b without taking into account a space for feeding or discharging the medium S.

Third Embodiment

Figure 9A:
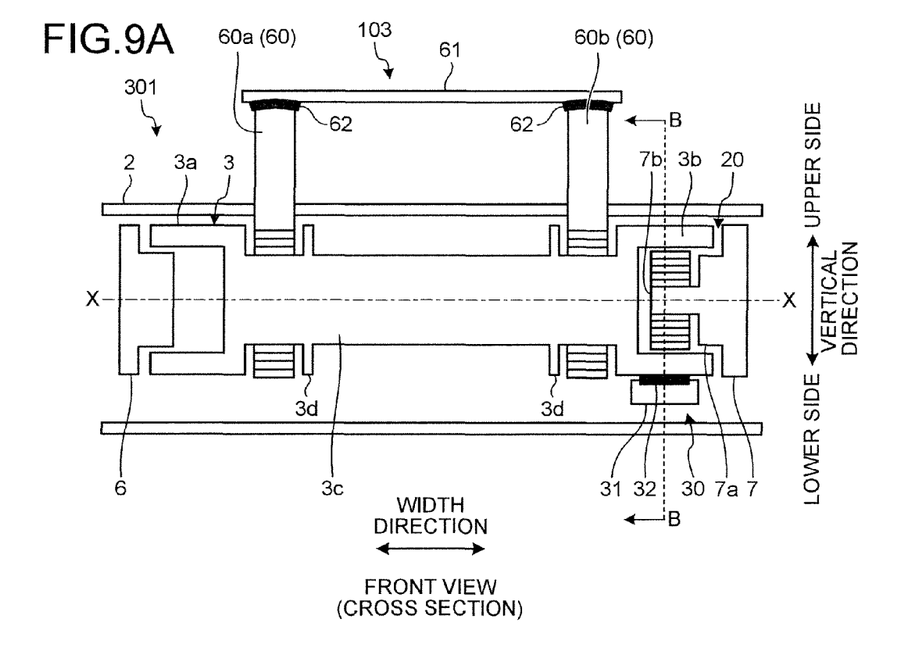
FIG. 9A is a front view of a medium stack tray according to a third embodiment.
Figure 9B:
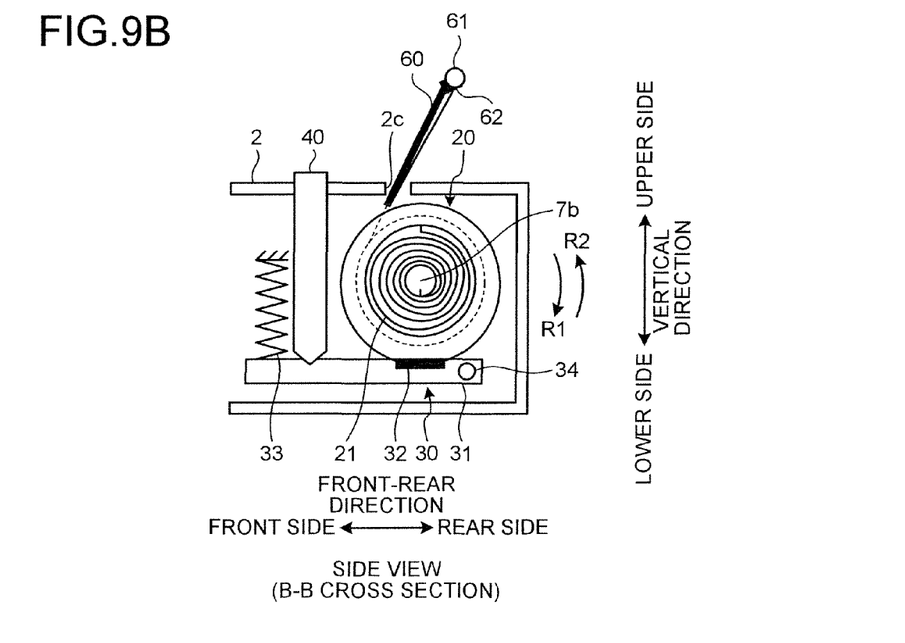
FIG. 9B is a side view of the medium stack tray according to the third embodiment.

A third embodiment will be described below with reference to FIGS. 9A, 9B, and FIG. 10. In the third embodiment, components that have the same functions as those of the above embodiments are denoted by the same reference numerals and explanation thereof is not repeated. FIG. 9A is a front view and FIG. 9B is a side view of a medium stack tray 103 according to the third embodiment; and FIG. 10 is a top view of an image reading apparatus 301 according to the third embodiment.

The medium stack tray 103 of the third embodiment is different from the medium stack tray of the above embodiments in that it includes a plurality of stacking members that are arranged in parallel in the width direction of one or more media S. As shown in FIGS. 9A and 9B, the medium stack tray 103 includes two stacking members 60 (i.e., 60a, 60b). Each of the stacking members 60a, 60b is in the form of a sheet or a plate, and is elastically deformable. Each of the stacking members 60a, 60b is formed in a curved shape in advance. The material of the stacking members 60 may be, for example, a stainless spring steel. The width of each of the stacking members 60a, 60b can be made smaller than the maximum width of the one or more media S to be fed. For example, the width of each of the stacking members 60a, 60b may be half or smaller than the maximum width of the media S. One stacking member 60a is fixed near the cylindrical portion 3a of the axial portion 3c. The other stacking member 60b is fixed near the cylindrical portion 3b of the axial portion 3c. That is, the stacking members 60 are arranged on the respective ends of the axial portion 3c. Stoppers 3d for regulating movement of the stacking members 60 in the axial direction are formed on the axial portion 3c.

The stacking member 60a and the stacking member 60b are coupled with each other via coupling parts 61. Connection parts 62 are fixed to respective top ends of the stacking member 60a and the stacking member 60b. The connection parts 62 of the third embodiment are fixing-to-edge members that are fixed to the edges of the stacking members 60 for fixing the stacking members 60 to the coupling parts 61. Each of the connection parts 62 is curved such that the center portion in the width direction is positioned closer to the top side than the both end portions. The stacking member 60a and the stacking member 60b are connected to the coupling parts 61 via the connection parts 62. The coupling parts 61 is a member in the form of a bar or a pipe, and couples the connection parts 62 of the stacking member 60a and the connection parts 62 of the stacking member 60b. The coupling parts 61 functions as a handle for pulling out the stacking members 60, similarly to the pulling parts 11 of the first and the second embodiments described above.

Figure 10:
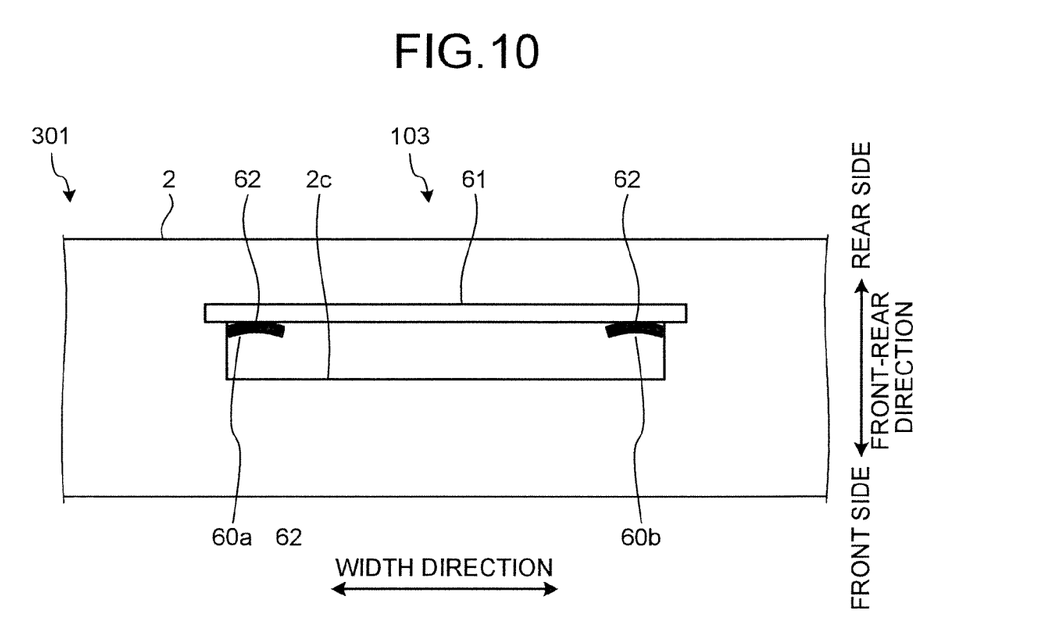
FIG. 10 is a top view of an image reading apparatus according to the third embodiment.

As shown in FIG. 10, the connection parts 62 are curved in accordance with the curved shape of the stacking members 60. That is, each of the stacking member 60a and the stacking member 60b is curved such that the center portion in the width direction is positioned closer to the rear side than the both end portions, and the connection parts 62 are curved in accordance with the curved shape of the stacking members 60. A hopper port 2c, which is a port for pulling out the stacking member 60a and the stacking member 60b from the case 2, is an opening in the form of a rectangle. The length of the coupling parts 61 in the width direction is longer than the length of the hopper port 2c, and the coupling parts 61 functions as a stopper when the stacking members 60 are wound up.

Because the stacking member 60a and the stacking member 60b are fixed to the common axial portion 3c, when the winding mechanism 20 rotates the axial portion 3c in the normal rotation direction R2, the stacking member 60a and the stacking member 60b are wound up around the axial portion 3c at the same speed. When a user pulls up the coupling parts 61 to pull out the stacking members 60, the axial portion 3c rotates in the reverse rotation direction R1, so that the stacking member 60a and the stacking member 60b are equally pulled out at the same speed. That is, the stacking member 60a and the stacking member 60b are pulled out and wound up in synchronization with each other.

According to the medium stack tray 103 of the third embodiment, each of the stacking members 60 is formed in a bar with a small width, so that downsizing and weight reduction can be attained. Further, because the widths of the stacking members 60 can be reduced, the stacking members 60 can have large curvatures without increasing the size in the front-rear direction.

While two stacking members 60 are formed in the third embodiment, the number of the stacking members 60 is not limited thereto. The medium stack tray 103 may include three or more stacking members 60. The disposition of the stacking members 60 in the width direction is not limited to the third embodiment.

In the third embodiment, the stacking members 60 have a curvature in advance. However, it is possible to form a curvature in the stacking members 60, which does not have a curvature in advance, by using the hopper port 2c or the connection parts 62.

Modification of the Third Embodiment

A modification of the third embodiment will be described below. In the third embodiment described above, a plurality of stacking members 60 is coupled with each other via the coupling parts 61. However, it is possible to at least some of the stacking members 60 are not coupled with the coupling parts 61 so as to be pulled out independently. For example, when two stacking members 60 are provided in total, the coupling parts 61 is omitted. In this case, the rotary shaft 3, the winding mechanism 20, the regulating mechanism 30, and the release button 40 are arranged for each of the stacking member 60a and the stacking member 60b such that the stacking member 60a and the stacking member 60b can be pulled out separately from each other. When three or more stacking members 60 are present, it is possible to arrange the stacking members 60 such that all of the stacking members 60 can be pulled out separately and independently. It is also possible to separate the stacking members 60 into a group of the stacking members 60 that are coupled with each other and remaining stacking members 60 that can be pulled out separately and independently. It is also possible to form a plurality of groups of the stacking members 60 that are coupled with each other. That is, it is possible to arrange the stacking members such that at least some of the stacking members 60 are coupled with each other by a member extending in the width direction, such as the coupling parts 61, at respective tip portions of the stacking members in the pull-out direction so that they can be pulled out in synchronization with each other. Since the hopper or the stacker formed of the stacking members 60 can be separately pulled out, it is possible to pull out and use only necessary stacking members 60 in accordance with the width of the one or more media S to be stacked.

Fourth Embodiment

Figure 11A:
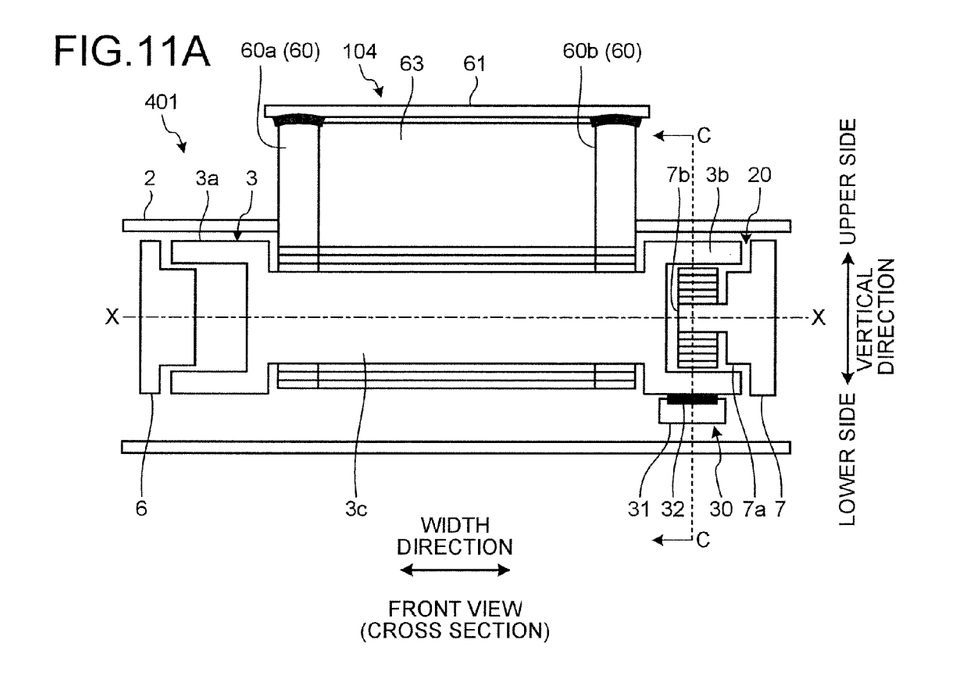
FIG. 11A is a front view of a medium stack tray according to a fourth embodiment.

A fourth embodiment will be described with reference to FIGS. 11A, 11B, and FIG. 12. In the fourth embodiment, components that have the same functions as those of the above embodiments are denoted by the same reference numerals and explanation thereof is not repeated. FIG. 11A is a front view and FIG. 11B is a side view of a medium stack tray 104 according to the fourth embodiment; and FIG. 12 is a top view of an image reading apparatus 1 according to the fourth embodiment.

The medium stack tray 104 of the fourth embodiment is different from the medium stack tray 103 of the third embodiment described above in that the stacking members 60 are connected to each other in a width direction by a flexible sheet member 63. With this structure, it is possible to set a medium S with a size smaller than a pitch between the stacking members 60.

Figure 11B:
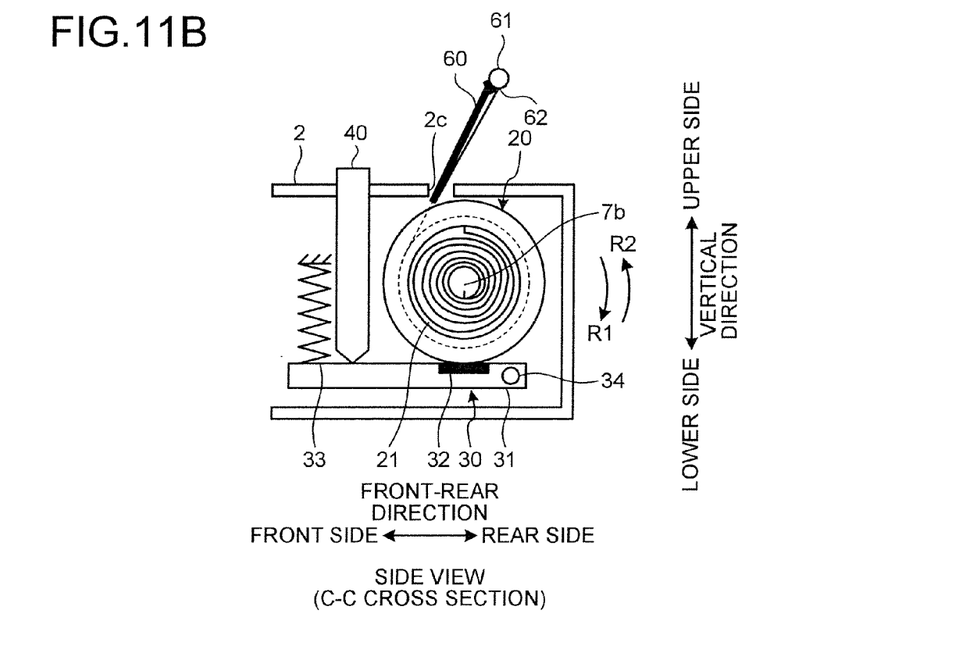
FIG. 11B is a side view of the medium stack tray according to the fourth embodiment.
Figure 12:
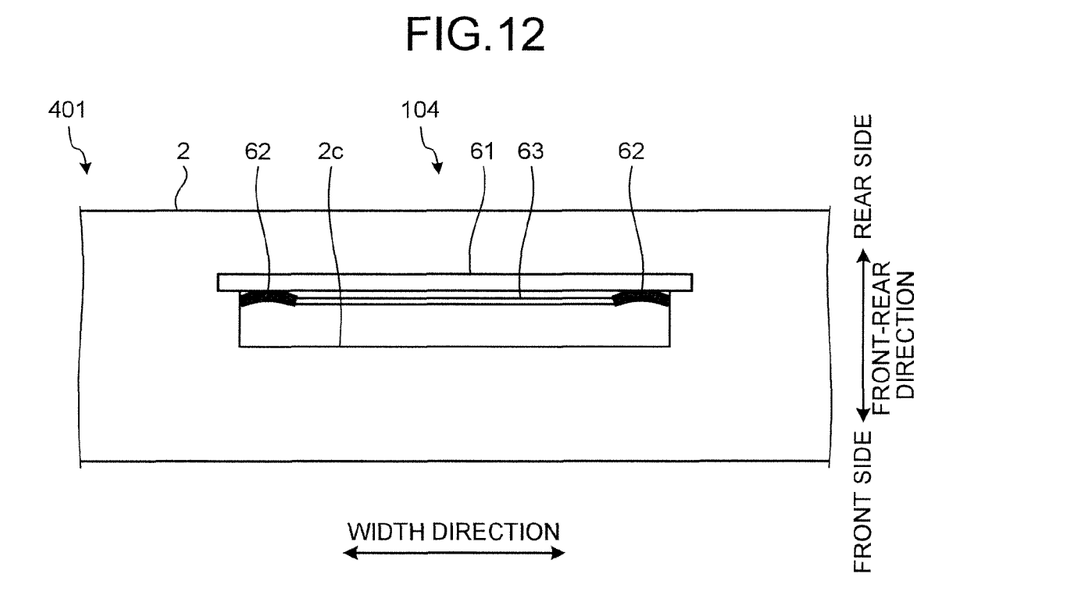
FIG. 12 is a top view of an image reading apparatus according to the fourth embodiment.

As shown in FIGS. 11A, 11B, and FIG. 12, the medium stack tray 104 includes a sheet 63 that connects the stacking member 60a and the stacking member 60b, which are coupled with each other by the coupling parts 61, in the width direction. The sheet 63 is made of a flexible material, and can be wound up around the axial portion 3c of the rotary shaft 3 together with the stacking members 60. When the stacking members 60 are pulled out by pulling up the coupling parts 61, the sheet 63 is pulled out integrally with the stacking members 60, so that a surface for stacking a medium S is formed. Because adjacent stacking members 60 are coupled with each other by the sheet 63 as described above, it is possible to form a hopper or a stacker that can stack a medium S with a width smaller than the pitch between the stacking members 60. Therefore, it is possible to handle a medium S with a small size and increase the size of a pitch between the stacking members 60, so that the number of the stacking members 60 can be reduced and weight and size of the apparatus can be reduced.

The medium stack tray according to the present invention includes a stacking member that can stack a sheet medium and can be wound up in a roll. In the stacking member that has been pulled out, at least a portion of the cross section perpendicular to the pull-out direction has a curved shape. Thus, since the stacking member of the medium stack tray of the present invention can be wound up in a roll, it is possible to house the stacking member in a compact manner.

Although the invention has been described with respect to specific embodiments for a complete and clear disclosure, the appended claims are not to be thus limited but are to be construed as embodying all modifications and alternative constructions that may occur to one skilled in the art that fairy fall within the basic teaching herein set forth.

What is claimed is:

1. A medium stack tray comprising:
a stacking member that stacks a sheet medium and that is configured to be wound in a roll;
a winding mechanism that winds the stacking member in a roll;
a regulating mechanism that regulates the stacking member that has been pulled out to be wound by the winding mechanism; and
a releasing mechanism that releases regulation for winding the stacking member by the regulating mechanism, wherein
in the stacking member that has been pulled out, at least a portion of a cross section thereof, in a perpendicular direction to a pull-out direction of the stacking member, has a curved shape.

2. The medium stack tray according to claim 1, wherein
the stacking member is elastically deformable,
a shape of the cross section of the stacking member that has been pulled out is formed in advance in the stacking member, and
the stacking member is elastically deformed such that the cross section perpendicular to the circumferential direction is formed in a linear shape when the stacking member is wound up by the winding mechanism, and the cross section returns to a shape formed in advance when the stacking member is pulled out.

3. The medium stack tray according to claim 1, wherein
the stacking member is elastically deformable and wound up by the winding mechanism such that the cross section perpendicular to the circumferential direction is formed in a linear shape,
a fixing-to-edge member is formed on a tip of the stacking member in the pull-out direction, the fixing-to-edge member being extending in a width direction of the sheet and fixed to an edge of the stacking member, and a shape of the cross section of the stacking member that has been pulled out is formed by elastically deforming the stacking member in accordance with a shape of the fixing-to-edge member.

4. The medium stack tray according to claim 1, wherein the stacking member is elastically deformable and wound up by the winding mechanism such that the cross section perpendicular to the circumferential direction is formed in a linear shape, an opening in a form of a slit is formed on a case that houses the stacking member that has been wound up, the opening being a port for pulling out the stacking member from the case, and a shape of the cross section of the stacking member that has been pulled out is formed by elastically deforming the stacking member in accordance with a shape of the opening.

5. The medium stack tray according to claim 1, further comprising:
one or more stacking members arranged in parallel in a width direction of the medium.

6. The medium stack tray according to claim 5, wherein at least one of the stacking members can be pulled out independently.

7. The medium stack tray according to claim 5, wherein at least two of the stacking members are coupled with each other via a member extending in the width direction, at respective tips of the stacking members in the pull-out direction, and can be pulled out in synchronization with each other.

8. The medium stack tray according to claim 7, further comprising:
a sheet member that is deformable and connects the stacking members that are coupled with each other, in the width direction, wherein
the sheet member is wound up together with the stacking members.

9. The medium stack tray according to claim 1, wherein the stacking member is a hopper for stacking a medium to be fed or a stacker for stacking a medium that has been discharged.

10. A medium stack tray comprising:
a stacking member that stacks a sheet medium and that is configured to be wound in a roll;
a winding mechanism that winds the stacking member in a roll;
a regulating mechanism that regulates the stacking member that has been pulled out to be wound by the winding mechanism; and
a releasing mechanism that releases regulation for winding the stacking member by the regulating mechanism, wherein
minimum area moment of inertia of a cross section of the stacking member that has been pulled out, the cross section being perpendicular to a pull-out direction, is greater than minimum area moment of inertia of a cross section of the stacking member that is wound up, the cross section being perpendicular to a circumferential direction.

11. The medium stack tray according to claim 10, wherein the stacking member is elastically deformable,
a shape of the cross section of the stacking member that has been pulled out is formed in advance in the stacking member, and
the stacking member is elastically deformed such that the cross section perpendicular to the circumferential direction is formed in a linear shape when the stacking member is wound up by the winding mechanism, and the cross section returns to a shape formed in advance when the stacking member is pulled out.

12. The medium stack tray according to claim 10, wherein the stacking member is elastically deformable and wound up by the winding mechanism such that the cross section perpendicular to the circumferential direction is formed in a linear shape, a fixing-to-edge member is formed on a tip of the stacking member in the pull-out direction, the fixing-to-edge member being extending in a width direction of the sheet and fixed to an edge of the stacking member, and a shape of the cross section of the stacking member that has been pulled out is formed by elastically deforming the stacking member in accordance with a shape of the fixing-to-edge member.

13. The medium stack tray according to claims 10, wherein the stacking member is elastically deformable and wound up by the winding mechanism such that the cross section perpendicular to the circumferential direction is formed in a linear shape, an opening in a form of a slit is formed on a case that houses the stacking member that has been wound up, the opening being a port for pulling out the stacking member from the case, and a shape of the cross section of the stacking member that has been pulled out is formed by elastically deforming the stacking member in accordance with a shape of the opening.

14. The medium stack tray according to claim 10, further comprising:
one or more stacking members arranged in parallel in a width direction of the medium.

15. The medium stack tray according to claim 14, wherein at least one of the stacking members can be pulled out independently.

16. The medium stack tray according to claim 14, wherein at least two of the stacking members are coupled with each other via a member extending in the width direction, at respective tips of the stacking members in the pull-out direction, and can be pulled out in synchronization with each other.

17. The medium stack tray according to claim 16, further comprising:
a sheet member that is deformable and connects the stacking members that are coupled with each other, in the width direction, wherein
the sheet member is wound up together with the stacking members.

18. The medium stack tray according to claim 10, wherein the stacking member is a hopper for stacking a medium to be fed or a stacker for stacking a medium that has been discharged.

* * * * *